(12) United States Patent
Choi et al.

(10) Patent No.: US 10,935,628 B2
(45) Date of Patent: Mar. 2, 2021

(54) CONTROL DEVICE FOR VEHICLE

(71) Applicant: LG ELECTRONICS INC., Seoul (KR)

(72) Inventors: Heedong Choi, Seoul (KR); Ho Yun, Seoul (KR); Boyoung Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 16/095,218

(22) PCT Filed: Apr. 20, 2017

(86) PCT No.: PCT/KR2017/004232
§ 371 (c)(1),
(2) Date: Oct. 19, 2018

(87) PCT Pub. No.: WO2017/183920
PCT Pub. Date: Oct. 26, 2017

(65) Prior Publication Data
US 2019/0137595 A1 May 9, 2019

(30) Foreign Application Priority Data

Apr. 20, 2016 (KR) .................. 10-2016-0048306

(51) Int. Cl.
*G01S 5/02* (2010.01)
*G06Q 50/30* (2012.01)
(Continued)

(52) U.S. Cl.
CPC .......... *G01S 5/0263* (2013.01); *G01S 19/01* (2013.01); *G05D 1/0088* (2013.01);
(Continued)

(58) Field of Classification Search
CPC ...... G01S 5/0263; G01S 19/01; H04W 4/029; H04W 4/40; H04W 88/08; G05D 1/0088; G05D 1/0285; G06Q 50/30; H04L 67/18
See application file for complete search history.

(56) References Cited

U.S. PATENT DOCUMENTS

2006/0095223 A1* 5/2006 Gordon ................. G01N 29/07
702/116
2008/0161986 A1* 7/2008 Breed ...................... G01S 19/07
701/23
2014/0195110 A1* 7/2014 Kim ..................... G01C 21/3697
701/36

FOREIGN PATENT DOCUMENTS

KR 10-2005-0030048 A 3/2005
KR 10-2007-0121893 A 12/2007
(Continued)

*Primary Examiner* — Anne Marie Antonucci
*Assistant Examiner* — Andrew J Cromer
(74) *Attorney, Agent, or Firm* — Birch, Stewart, Kolasch & Birch, LLP

(57) ABSTRACT

A method for controlling a vehicle having a sensor and a display is provided. The method includes the steps of: generating position information of the vehicle on the basis of information received from the sensor; when an external terminal is located within a predetermined range on the basis of the vehicle, receiving position information of the external terminal from the external terminal; setting a current position of the vehicle on the basis of the position information of the vehicle and the position information of the external terminal; and executing one or more functions on the basis of the set current position.

18 Claims, 10 Drawing Sheets

(51) Int. Cl.
*G01S 19/01* (2010.01)
*H04W 4/029* (2018.01)
*H04W 4/40* (2018.01)
*G05D 1/00* (2006.01)
*G05D 1/02* (2020.01)
*H04W 88/08* (2009.01)

(52) U.S. Cl.
CPC ............ *G05D 1/0285* (2013.01); *G06Q 50/30* (2013.01); *H04W 4/029* (2018.02); *H04W 4/40* (2018.02); *G05D 2201/0213* (2013.01); *H04W 88/08* (2013.01)

(56) References Cited

FOREIGN PATENT DOCUMENTS

| | | |
|---|---|---|
| KR | 10-2009-0030001 A | 3/2009 |
| KR | 10-2012-0134226 A | 12/2012 |
| KR | 10-2015-0009814 A | 1/2015 |
| KR | 10-1610502 B1 | 4/2016 |

* cited by examiner

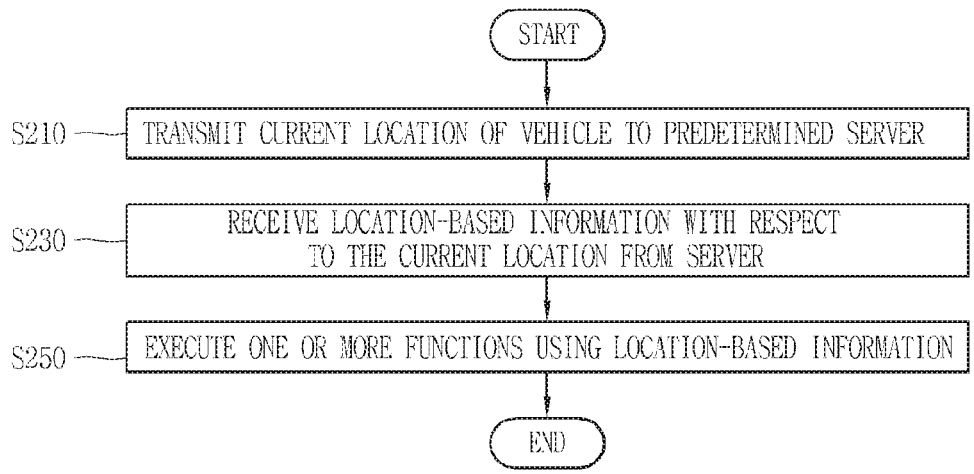
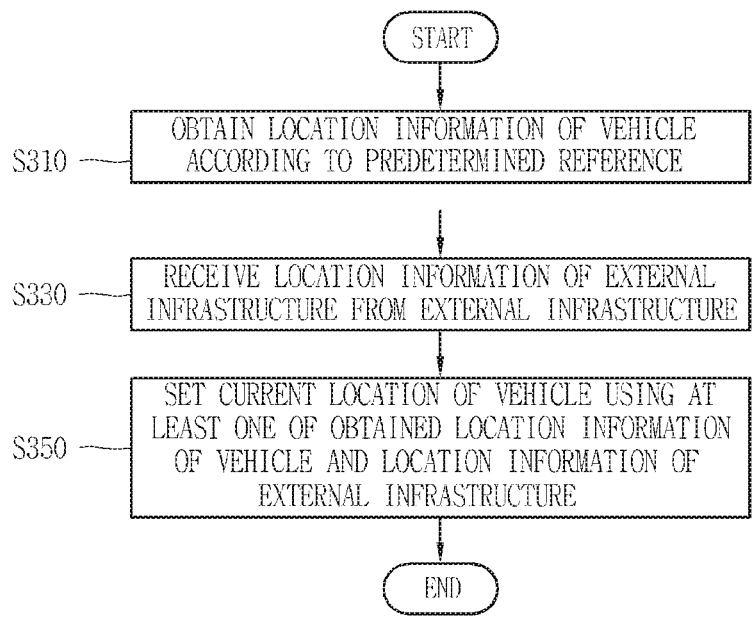

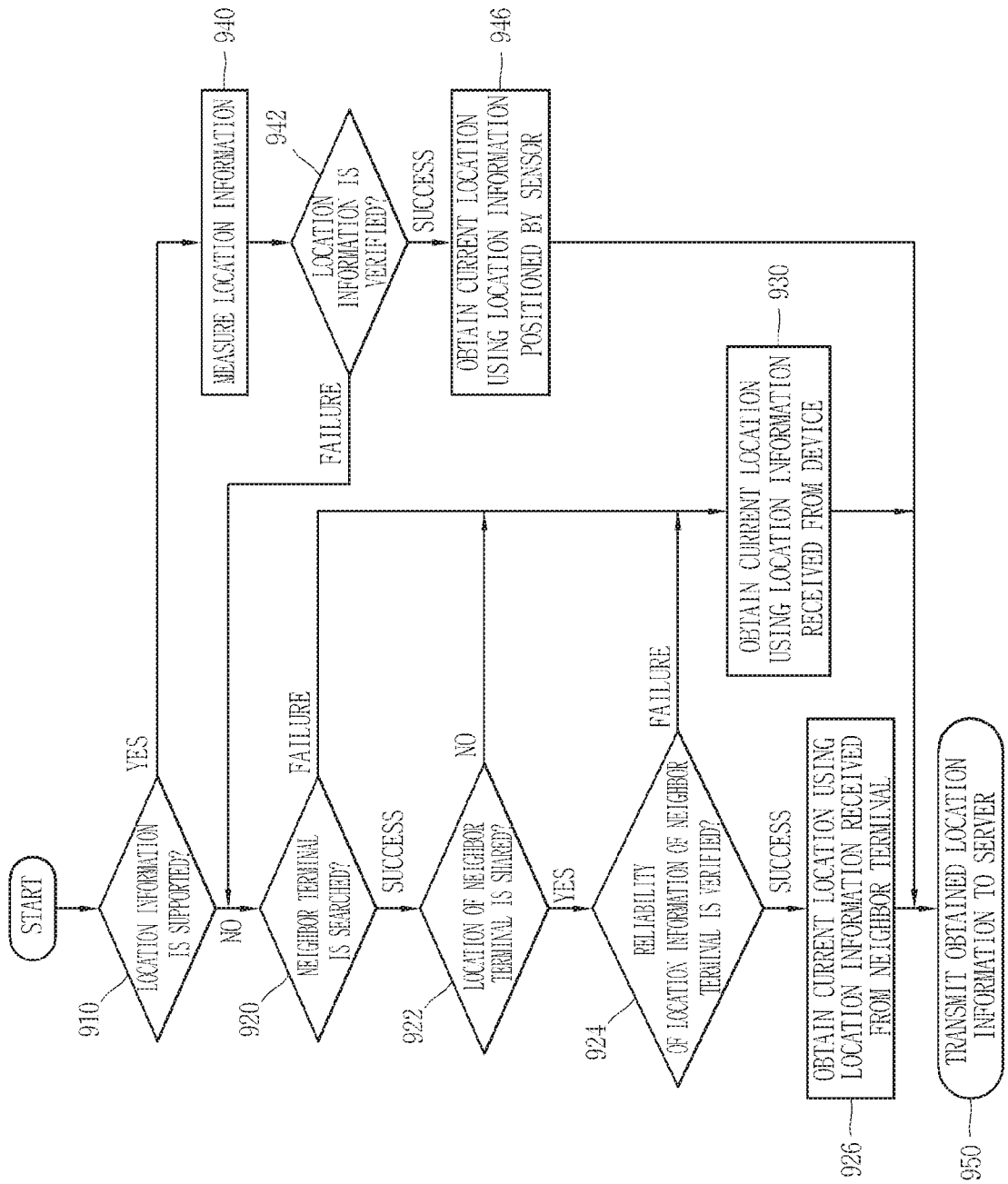

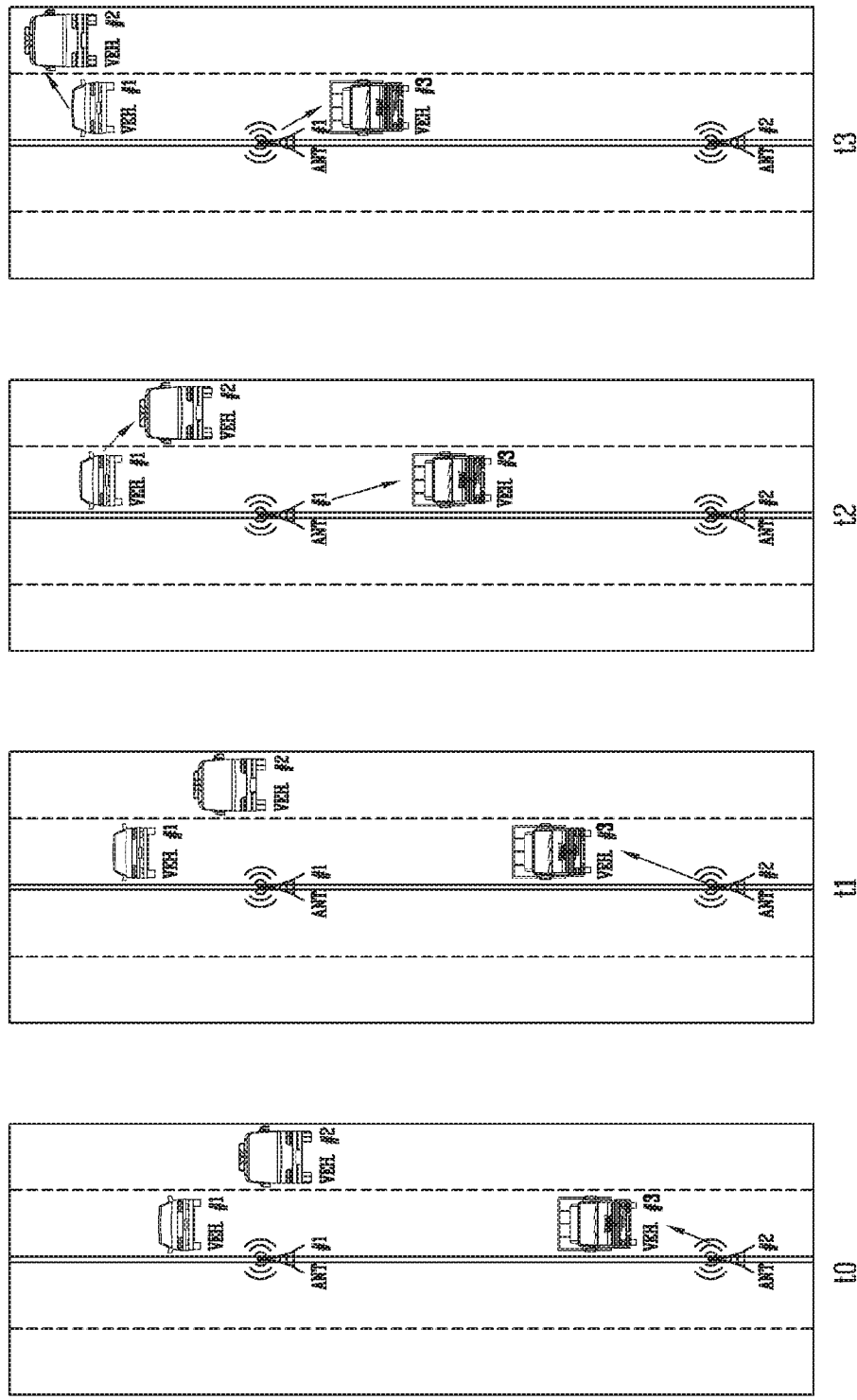

FIG. 10B

| | t0 | t1 | t2 | t3 | TIME |
|---|---|---|---|---|---|
| VEHICLE 1 | $X^{VEH.\ \#1}_{t0}, Y^{VEH.\ \#1}_{t0}$ | $X^{VEH.\ \#1}_{t1}, Y^{VEH.\ \#1}_{t1}$ | $X^{VEH.\ \#1}_{t2}, Y^{VEH.\ \#1}_{t2}$ | $X^{VEH.\ \#1}_{t3}, Y^{VEH.\ \#1}_{t3}$ | |
| VEHICLE 2 | $X^{VEH.\ \#2}_{t0}, Y^{VEH.\ \#2}_{t0}$ | $X^{VEH.\ \#2}_{t1}, Y^{VEH.\ \#2}_{t1}$ | SENSOR FAULT NONE | NONE | |
| VEHICLE 3 | SENSOR FOR ESTIMATING LOCATION IS NOT PRESENT NONE | NONE | NONE | NONE | |

FIG. 10C

| | t0 | t1 | t2 | t3 | TIME |
|---|---|---|---|---|---|
| VEHICLE 1 | $X^{VEH.\ \#1}_{t0}, Y^{VEH.\ \#1}_{t0}$ | $X^{VEH.\ \#1}_{t1}, Y^{VEH.\ \#1}_{t1}$ | $X^{VEH.\ \#1}_{t2}, Y^{VEH.\ \#1}_{t2}$ | $X^{VEH.\ \#1}_{t3}, Y^{VEH.\ \#1}_{t3}$ | |
| VEHICLE 2 | $X^{VEH.\ \#2}_{t0}, Y^{VEH.\ \#2}_{t0}$ | $X^{VEH.\ \#2}_{t1}, Y^{VEH.\ \#2}_{t1}$ | $X^{VEH.\ \#1}_{t2}, Y^{VEH.\ \#1}_{t2}$ | $X^{VEH.\ \#1}_{t3}, Y^{VEH.\ \#1}_{t3}$ | |
| VEHICLE 3 | $X^{ANT.\ \#2}, Y^{ANT.\ \#2}$ | $X^{ANT.\ \#2}, Y^{ANT.\ \#2}$ | $X^{ANT.\ \#1}, Y^{ANT.\ \#1}$ | $X^{ANT.\ \#1}, Y^{ANT.\ \#1}$ | |

CONTROL DEVICE FOR VEHICLE

CROSS-REFERENCE TO RELATED APPLICATIONS

This application is the National Stage filing under 35 U.S.C. 371 of International Application No. PCT/KR2017/004232, filed on Apr. 20, 2017, which claims the benefit of earlier filing date and right of priority to Korean Application No. 10-2016-0048306, filed on Apr. 20, 2016, the contents of which are all hereby incorporated by reference herein in their entirety.

TECHNICAL FIELD

The present disclosure relates to a control device for a vehicle which is provided in a vehicle and executes one or more functions on the basis of location information of the vehicle.

BACKGROUND ART

Vehicles refer to a means of transportation that may move a person or a load using kinetic energy. A typical example of a vehicle may be an automobile.

For the safety and convenience of users of vehicles, various sensors and devices are provided in the vehicles and functions of the vehicles are diversified.

The functions of the vehicles may include a convenience function for facilitating drivers' convenience and a safety function for securing drivers' and/or pedestrians' safety.

First, the convenience function has a development motive related to driver convenience such as providing an infotainment (information+entertainment) function to vehicles, supporting partial autonomous driving function, assisting to secure a view of a driver at night or in a blind spot. For example, active cruise control (ACC), a smart parking assist system (SPAS), a night vision (NV), a head up display (HUD), an around view monitor (AVM), an adaptive headlight system (AHS), and the like.

The safety function, which is a technology to secure drivers' safety or pedestrians' safety, includes a lane departure warning system (LDWS), a lane keeping assist system (LKAS), an autonomous emergency braking (AEB) function, and the like.

In order to support and enhance the functions of vehicles, improvement of structural parts and/or software parts of control devices of vehicles maybe considered.

Recently, a location-based service (LBS) based on a location of a vehicle has been developed. It refers to a service providing various types of information related to locations such as a location tracking service, a public safety service, and the like, by attaching a chip connected to a base station or a global positioning system (GPS), to a vehicle. That is, the LBS provides various services on the basis of location information obtained through a wired/wireless communication network.

The GPS scheme includes a cell scheme using a mobile communication base station and a GPS scheme utilizing a satellite navigation device. The cell scheme, a scheme started to be developed and spread before or after the year 2000, has difficulty in finding an exact location because an error range of a location may reach several kilometers. However, since the cell scheme uses a repeater, or the like, it may advantageously find a location within a building or the underground.

The GPS scheme is a system in which a chip built in a mobile phone reads location information sent from satellites and informs a base station about the read location information. This service has been introduced after the cell scheme and has an advantage that an error range of a location is several hundred meters, more accurate than the cell scheme. However, due to the characteristics of a satellite signal, it is almost impossible to use the GPS scheme in tall buildings or indoor areas where reflection and refraction are easily made.

In particular, since vehicles move at high speeds and mainly run in downtown areas with a lot of tall buildings, it is difficult to estimate an accurate location of a vehicle with the existing methods. When a location of a vehicle is not accurately specified, a location-based service provided to the user is inaccurate.

DISCLOSURE

Technical Problem

The present disclosure aims at solving the above-mentioned problems and other problems.

Another object of the present disclosure is to provide a control device for a vehicle, capable of allowing a vehicle to more accurately estimate/calculate a location of the vehicle itself.

Another object of the present disclosure is to provide a control device for a vehicle, capable of estimating a current location of a vehicle using a V2X communication environment even when location information of the vehicle cannot be obtained by a sensor provided in the vehicle.

Technical Solution

According to an aspect of the present disclosure, there is provided a vehicle control device provided in a vehicle, including: a wireless communication unit transmitting a current location of the vehicle to a predetermined server and receiving location-based information with respect to the current location from the server; and a controller executing one or more functions using the location-based information, wherein the controller receives location information of a device which fixedly transmits predetermined location information, from the device, using the wireless communication unit and sets the current location using the location information of the device.

In an embodiment, when location information of the vehicle cannot be obtained according to a predetermined reference, the controller may set the current location using the location information of the device.

In an embodiment, when pieces of location information of a plurality of devices are received from the plurality of devices, the controller may select any one device on the basis of distances between the vehicle and each of the plurality of devices, and set the current location using the location information of the selected device.

In an embodiment, the controller may reset the current location on the basis of the location information of the selected device, a movement direction of the vehicle, and a speed of the vehicle.

In an embodiment, when the current location is set using the location information of the selected device, the controller may control the wireless communication unit to transmit the current location and information of the selected device to the server, and when an unavailability message regarding the selected device is received from the server, the controller may select another device from among the plurality of devices, excluding the selected device, and reset the current location using location information of the other device.

In an embodiment, the vehicle control device may further include: a display unit outputting information related to the selected device.

In an embodiment, the wireless communication unit may receive location information of a terminal positioned within a predetermined distance, and if a distance between the vehicle and the terminal is shorter than a distance between the vehicle and the device, the controller may set the current location using the location information of the terminal, instead of the location information of the device.

In an embodiment, the vehicle control device may further include: a plurality of sensors, wherein the controller calculates location information of the vehicle using the plurality of sensors, and when the calculated location information meets the predetermined reference, the controller may set the current location using the calculated location information, and when the calculated location information does not meet the predetermined reference, the controller may set the current location using at least one of the location information of the device and the location information of the terminal.

In an embodiment, the controller may set the predetermined reference using at least one of the location information of the device and the location information of the terminal.

In an embodiment, the controller may set the predetermined reference using at least one of the location information of the device and the location information of the terminal.

In an embodiment, the controller may verify sensing information sensed by each sensor on the basis of the predetermined reference and calculate location information of the vehicle by selectively using only a sensor which has passed verification, among the plurality of sensors.

In an embodiment, if none of the plurality of sensors has passed the verification, the controller may determine that the calculated location information does not meet the predetermined reference.

In an embodiment, when location information of a plurality of terminals are received from the plurality of terminals, the controller may select any one of the plurality of terminals on the basis of distances between the vehicle and each of the plurality of terminals and set the current location using at least one of the location information of the selected terminal and the location information of the device.

In an embodiment, the vehicle control device may further include: a display unit outputting information related to the selected terminal.

In an embodiment, when the location information of the vehicle cannot be obtained on the basis of the predetermined reference, the controller may transmit a location information request message to the terminal positioned within the predetermined distance.

In an embodiment, the vehicle control device may further include: a display unit, wherein when the location information of the vehicle cannot be obtained on the basis of the predetermined reference, the controller may search for a terminal positioned within the predetermined distance and control the display unit to output information related to the searched terminal.

In an embodiment, when outputting the information related to the searched terminal, the controller may highlight a terminal providing location information so as to be distinguished from a terminal not providing location information.

In an embodiment, the controller may transmit the location information request message to at least one terminal selected according to a user input, among searched terminals.

In an embodiment, a location of the terminal may be flexible and a location of the device may be fixed.

In an embodiment, when location information of the vehicle cannot be obtained on the basis of a predetermined reference and the location information of the device is not valid, the controller may control the wireless communication unit to transmit an information providing unavailability message, instead of the current location of the vehicle, to the predetermined server.

Meanwhile, an embodiment of the present disclosure relates to a control method of a vehicle control device. The control method, which is a control method of a vehicle control device provided in a vehicle, includes: setting a current location of the vehicle; transmitting the current location to a predetermined server; receiving location-based information with respect to the obtained location information from the predetermined server; and executing one or more functions using the received location-based information, wherein the setting of the current location includes: obtaining location information of the vehicle according to a predetermined reference; when the location information of the vehicle is obtained according to the predetermined reference, setting the current location using the location information of the vehicle; receiving location information of a device which fixedly transmits predetermined location information, from the device; and when the location information of the vehicle cannot be obtained according to the predetermined reference, setting the current location using the location information of the device.

Meanwhile, an embodiment of the present disclosure relates to a vehicle control method controlling a vehicle having a sensor and a display. The vehicle control method may include: generating location information of the vehicle on the basis of information received from the sensor; when an external terminal is located within a predetermined range with respect to the vehicle, receiving location information of the external terminal from the external terminal; setting a current location of the vehicle on the basis of the location information of the vehicle and the location information of the external terminal; and executing one or more functions on the basis of the set current location.

According to an embodiment, the setting of the current location of the vehicle may include: when the location information of the vehicle meets a predetermined reference, setting the current location of the vehicle using the location information of the vehicle; and when the location information of the vehicle does not meet the predetermined reference, setting the current location of the vehicle using the location information of the external terminal.

According to an embodiment, the setting of the current location of the vehicle may further include: setting the predetermined reference using the location information of the external terminal.

According to an embodiment, the sensor may be a plurality of sensors, and the generating of the location information of the vehicle may include: verifying sensing information sensed by each sensor on the basis of the predetermined reference; and generating location information of the vehicle selectively using only a sensor which has passed verification, among the plurality of sensors.

According to an embodiment, if none of the plurality of sensors has passed the verification, it may be determined that the location information of the vehicle does not meet the predetermined reference.

According to an embodiment, the external terminal may include at least one of a fixed terminal which transmits predetermined location information from a fixed location and a mobile terminal which is mounted in a movable object and transmits flexible location information.

According to an embodiment, in the setting of the current location of the vehicle, if the location information of the vehicle cannot be obtained on the basis of the predetermined reference, the current location of the vehicle may be set using location information of the fixed terminal received from the fixed terminal.

According to an embodiment, the setting of the current location of the vehicle may include: when location information is received from each of a plurality of fixed terminals, selecting at least one of the plurality of fixed terminals on the basis of distances between the vehicle and each of the plurality of fixed terminals; and setting the current location of the vehicle using location information of the selected fixed terminal.

According to an embodiment, the vehicle control method may further include: resetting the current location of the vehicle on the basis of the location information of the selected fixed terminal, a movement direction of the vehicle, and a speed of the vehicle.

According to an embodiment, the setting of the current location of the vehicle may further include: transmitting the current location of the vehicle and the location information of the selected fixed terminal to a server; when an unavailability message regarding the selected fixed terminal is received from the server, selecting another fixed terminal from among the plurality of fixed terminals excluding the selected fixed terminal; and resetting the current location of the vehicle using location information of the other fixed terminal.

According to an embodiment, the setting of the current location of the vehicle may include: when a plurality of external terminals are located within the predetermined range, selecting at least one of the plurality of external terminals on the basis of distances between the vehicle and each of the plurality of external terminals; and setting the current location of the vehicle on the basis of at least one of the location information of the vehicle and location information of the selected external terminal.

According to an embodiment, the vehicle control method may further include: when it is determined that an external terminal is located within the predetermined range on the basis of information received from the sensor, controlling the display to display information related to the external terminal; and when location information of the external terminal is received from the external terminal, highlighting the information related to the external terminal to guide that the location information of the external terminal is received.

According to an embodiment, when a first external terminal which transmits location information and a second external terminal which does not transmits location information are positioned within the predetermined range, information related to the first external terminal and information related to the second external terminal may be displayed on the display, the information related to the first external terminal may be highlighted, and the information related to the second external terminal may not be highlighted.

According to an embodiment, the vehicle control method may further include: when a user input is applied to the information related to the second external terminal, transmitting a location information request message to the second external terminal.

According to an embodiment, the vehicle control method may further include: controlling the vehicle to perform autonomous driving to maintain a predetermined distance from the selected external terminal.

Meanwhile, an embodiment of the present disclosure relates to a vehicle control device for controlling a vehicle having a sensor and a display. The vehicle control device may include: a controller, when an external terminal is determined to be positioned within a predetermined range on the basis of information received from the sensor, controlling the display to display information related to the external terminal; and a communication unit receiving location information of the external terminal from the external terminal, wherein when location information of the external terminal is received from the external terminal, the controller may highlight information related to the external terminal to guide that the location information of the external terminal is received.

According to an embodiment, when a first external terminal which transmits location information and a second external terminal which does not transmits location information are positioned within the predetermined range, the controller may control the display to display information related to the first external terminal and information related to the second external terminal, and the information related to the first external terminal may be highlighted and the information related to the second external terminal may not be highlighted.

According to an embodiment, when a user input is applied to the information related to the second external terminal, the controller may transmit a location information request message to the second terminal using the communication unit.

According to an embodiment, the controller may generate location information of the vehicle on the basis of information received from the sensor, and when the location information of the vehicle meets a predetermined reference, the controller may set the current location of the vehicle using the location information of the vehicle, and when the location information of the vehicle does not meet the predetermined reference, the controller may set the current location of the vehicle using the location information of the external terminal.

According to an embodiment, the predetermined reference may be set to be different according to location information of the external terminal.

Advantageous Effects

The effects of the control device and control method for a vehicle according to the present disclosure are as follows.

According to at least one of the embodiments of the present disclosure, although a vehicle does not have a sensor for measuring location information or even in a situation in which the sensor is broken, a current location of the vehicle may be obtained to provide a location-based service.

In addition, since location information measured by a sensor is verified using information obtained from an external infrastructure and only a sensor that has passed the verification is selectively used, a current location may be measured more accurately.

Also, since a location information request message may be transmitted to a terminal located within the predetermined range, location information may be received from the terminal. A user may receive authorized location information from another vehicle which is traveling on the substantially same route and provide a location-based service using the received location information.

DESCRIPTION OF DRAWINGS

FIG. 2 is a flowchart illustrating a control operation of the control device for a vehicle described with reference to FIG. 1.

FIG. 3 is a flowchart illustrating a method of setting, by a control device for a vehicle, a current location upon receiving location information of a device which fixedly transmits preset location information, from the device.

FIG. 9 is a flowchart illustrating a control method of a control device for a vehicle according to an embodiment of the present disclosure.

FIGS. 10A, 10B, and 10C are views illustrating location information generated according to the control method of FIG. 9.

BEST MODES

Figure 1:
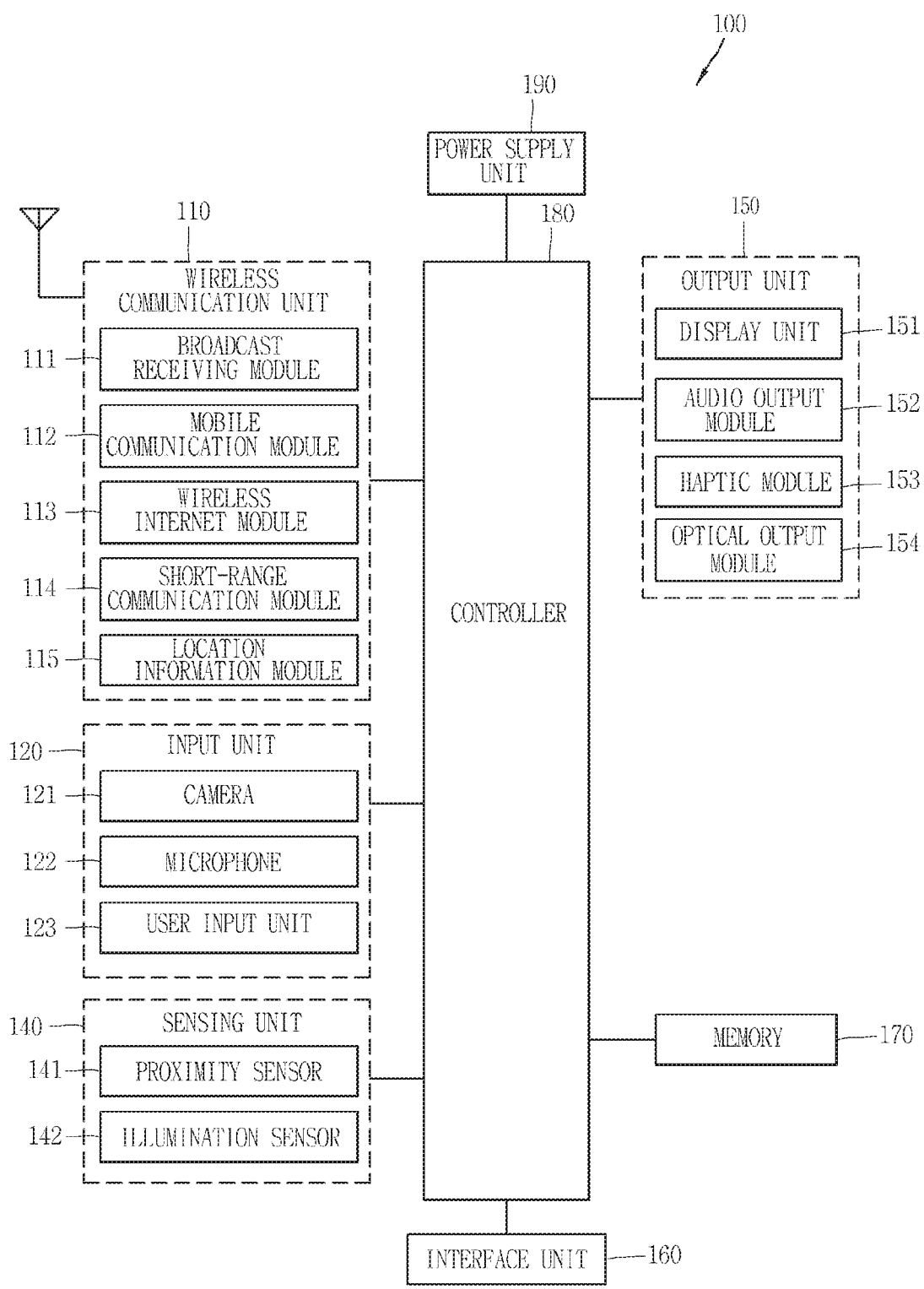
FIG. 1 is a block diagram of a control device for a vehicle related to the present disclosure.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle control device described in this disclosure is a device for electronically controlling at least one component provided in a vehicle and may be, for example, an electronic control unit (ECU).

The vehicle control device may be implemented as a fixed terminal such as a digital TV, a desktop computer, a digital signage, or the like, as well as a mobile terminal such as a mobile phone, a smart phone, a laptop computer, a digital broadcasting terminal, a personal digital assistant (PDA), a portable multimedia player (PMP), a navigator, a slate PC, a table PC, an ultrabook, and a wearable device.

FIG. 1 is a block diagram illustrating a vehicle control device related to the present disclosure.

The vehicle control device 100 includes a wireless communication unit 110, an input unit 120, a sensing unit 140, an output unit 150, an interface unit 160, a memory 170, a controller 180, and a power supply unit 190. The component illustrated in FIG. 1 are not essential and the vehicle control device described in this disclosure may have greater or fewer components.

In detail, among the components mentioned above, the wireless communication unit 110 may include one or more modules allowing wireless communication between the vehicle control device 100 and a wireless communication system, between the vehicle control device 100 and another vehicle control device, or between the vehicle control device and an external server. Also, the wireless communication unit 110 may include one or more modules connecting the vehicle control device 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 may include one or more sensors for sensing at least one of information inside the vehicle control device 100, surrounding environment information of the vehicle control device 100, and user information. For example, the sensing unit 140 may include a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The vehicle control device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the vehicle control device 100 and a user, as well as function as the user input unit 123 which provides an input interface between the vehicle control device 100 and the user.

The interface unit 160 serves as an interface with various types of external devices that can be coupled to the vehicle control device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the vehicle control device 100 may perform assorted control functions associated with a connected external device, in response to the external device being connected to the interface unit 160.

The memory 170 is typically implemented to store data to support various functions or features of the vehicle control device 100. For instance, the memory 170 may be configured to store application programs executed in the vehicle control device 100, data or instructions for operations of the vehicle control device 100, and the like. Some of these application programs may be downloaded from an external server via wireless communication. Other application programs may be installed within the vehicle control device 100 at time of manufacturing or shipping, which is typically the case for basic functions of the vehicle control device 100 (for example, receiving a call, placing a call, receiving a message, sending a message, and the like). It is common for application programs to be stored in the memory 170, installed in the vehicle control device 100, and executed by the controller 180 to perform an operation (or function) for the vehicle control device 100.

The controller 180 typically functions to control overall operation of the vehicle control device 100, in addition to the operations associated with the application programs. The controller 180 may provide or process information or functions appropriate for a user by processing signals, data, information and the like, which are input or output by the various components described above, or activating application programs stored in the memory 170.

Also, the controller 180 may control at least some of the components described above with reference to FIG. 1A according to the execution of an application program that have been stored in the memory 170. In addition, the controller 180 may operate a combination of at least two of the components included in the vehicle control device 100.

The power supply unit 190 can be configured to receive external power or provide internal power in order to supply appropriate power required for operating elements and components included in the vehicle control device 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Hereinafter, before describing various embodiments implemented through the vehicle control device 100 described above, the components mentioned above will be described in detail with reference to FIG. 1.

The mobile communication module 112 can transmit and/or receive wireless signals to and from one or more network entities. Typical examples of a network entity include a base station, an external vehicle control device, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the vehicle control device 100. The wireless Internet module 113 may transmit and/or receive wireless signals via communication networks according to wireless Internet technologies.

The short-range communication module 114 in general supports wireless communications between the vehicle control device 100 and a wireless communication system, communications between the vehicle control device 100 and another vehicle control device 100, or communications between the vehicle control device and a network where another vehicle control device 100 (or an external server) is located, via wireless area networks. One example of the wireless area networks is a wireless personal area network.

The location information module 115 is generally configured to detect, calculate, derive or otherwise identify a position of the vehicle control device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the vehicle control device. As one example, when the vehicle control device uses a GPS module, a position of the vehicle control device may be obtained using a signal sent from a GPS satellite. As another example, when the vehicle control device uses the Wi-Fi module, a position of the vehicle control device can be obtained based on information related to a wireless access point (AP) which transmits or receives a wireless signal to or from the Wi-Fi module. If necessary, the location information module 115 may perform any function of the other modules of the wireless communication unit 110 to obtain data regarding a position of the vehicle control device 100 substitutively or additionally. The location information module 115 is used to obtain a position (or current position) of the vehicle control device 100 and is not limited to a module for directly calculating or obtaining a position of the vehicle control device.

The sensing unit 140 is generally configured to sense one or more of internal information of the vehicle control device, surrounding environment information of the vehicle control device, user information, or the like. The controller 180 generally cooperates with the sending unit 140 to control operation of the vehicle control device 100 or execute data processing, a function or an operation associated with an application program installed in the vehicle control device based on the sensing provided by the sensing unit 140.

The display unit 151 is generally configured to output information processed in the vehicle control device 100. For example, the display unit 151 may display execution screen information of an application program executing at the vehicle control device 100 or user interface (UI) and graphic user interface (GUI) information in response to the execution screen information.

The display unit 151 may be provided as two or more display units according to implementation forms. In this case, in the vehicle control device, a plurality of display units may be disposed to be spaced apart from each other or integrally on one surface or may be disposed on different sides, respectively.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The display unit 151 may also form a touch screen together with the touch sensor. Here, the touch screen may serve as the user input unit 123 (See FIG. 1A).

At least some of the components may operate in cooperation with each other to implement operations, control, or control methods of the vehicle control device 100 according to various embodiments described hereinafter. Also, the operations, control, or control methods of the vehicle control device 100 may be implemented in the vehicle control device 100 according to driving of at least one application program stored in the memory 170.

Meanwhile, various embodiments described below may be implemented in a recording medium which may be read by a computer or a similar device using software, hardware, and a combination thereof, for example.

Hereinafter, a communication system which is operable with the vehicle control device 100 according to the present disclosure will be described.

First, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

A CDMA wireless communication system is shown having a plurality of vehicle control devices 100, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

Global Positioning System (GPS) satellites 300 facilitate locating the position of at least one of plural vehicle control devices 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

The location information module 115 is generally configured to detect, calculate, or otherwise identify a position of the vehicle control device. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the vehicle control device.

A typical GPS module 115 can measure an accurate time and distance from three or more satellites, and accurately calculate a current location of the vehicle control device according to trigonometry based on the measured time and distances. A method of obtaining distance and time information from three satellites and performing error correction with a single satellite may be used. In particular, the GPS module may obtain an accurate time together with three-dimensional speed information as well as the location of the latitude, longitude and altitude values from the location information received from the satellites.

Furthermore, the GPS module can obtain speed information in real time to calculate a current position. Sometimes, accuracy of a measured position may be compromised when the vehicle control device is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the vehicle control device 100.

This technology typically includes the use of a Wi-Fi module in the vehicle control device 100 and a wireless access point for communicating with the Wi-Fi module.

The Wi-Fi positioning system may include a Wi-Fi location determination server, a vehicle control device, a wireless access point (AP) connected to the vehicle control device, and a database stored with wireless AP information.

The vehicle control device connected to the wireless AP may transmit a location information request message to the Wi-Fi location determination server. The Wi-Fi location determination server extracts the information of the wireless AP connected to the vehicle control device 100, based on the location information request message (or signal) of the vehicle control device 100. The information of the wireless AP may be transmitted to the Wi-Fi location determination server through the vehicle control device 100, or may be transmitted to the Wi-Fi location determination server from the wireless AP.

The information of the wireless AP extracted based on the location information request message of the vehicle control device 100 may include one or more of media access control (MAC) address, service set identification (SSID), received signal strength indicator (RSSI), reference signal received Power(RSRP), reference signal received quality(RSRQ), channel information, privacy, network type, signal strength, noise strength, and the like.

The Wi-Fi location determination server may receive the information of the wireless AP connected to the vehicle control device 100 as described above, and may extract wireless AP information corresponding to the wireless AP connected to the vehicle control device from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the vehicle control device 100 using at least one wireless AP information extracted from the database.

A method for extracting (analyzing) location information of the vehicle control device 100 may include a Cell-ID method, a fingerprint method, a trigonometry method, a landmark method, and the like.

The Cell-ID method is used to determine a position of a wireless AP having the largest signal strength, among peripheral wireless AP information collected by a vehicle control device, as a position of the vehicle control device. The Cell-ID method is an implementation that is minimally complex, does not require additional costs, and location information can be rapidly obtained. However, in the Cell-ID method, the precision of positioning may fall below a desired threshold when the installation density of wireless APs is low.

The fingerprint method is used to collect signal strength information by selecting a reference position from a service area, and to track a position of a vehicle control device using the signal strength information transmitted from the vehicle control device based on the collected information. In order to use the fingerprint method, it is common for the characteristics of radio signals to be pre-stored in the form of a database.

The trigonometry method is used to calculate a position of a vehicle control device based on a distance between coordinates of at least three wireless APs and the vehicle control device. In order to measure the distance between the vehicle control device and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a vehicle control device using a known landmark transmitter.

In addition to these position location methods, various algorithms may be used to extract (analyze) location information of a vehicle control device.

Such extracted location information may be transmitted to the vehicle control device 100 through the Wi-Fi location determination server, thereby obtaining location information of the vehicle control device 100.

The vehicle control device 100 can obtain location information by being connected to at least one wireless AP. The number of wireless APs required to obtain location information of the vehicle control device 100 may be variously changed according to a wireless communication environment within which the vehicle control device 100 is located.

Hereinafter, embodiments related to a control method that may be implemented in the vehicle control device configured as described above will be described with reference to the accompanying drawings. It will be apparent to those skilled in the art that modifications and variations can be made without departing from the spirit and scope of the invention.

Hereinafter, descriptions will be made with reference to the accompanying drawings in a clockwise direction or in order downwardly, with respect to a drawing provided on the left upper side.

FIG. 2 is a flowchart illustrating a control operation of a control device for a vehicle described above with reference to FIG. 1.

The control device 100 for a vehicle (or vehicle control device 100) may obtain a current location of the vehicle in various manners and perform various functions on the basis of the obtained current location. As one example of various functions, the controller may transmit the current location of the vehicle to the server.

First, the controller transmits the current location of the vehicle to a predetermined server (S210).

The current location of the vehicle may be obtained by sensors provided in the vehicle or by information received wirelessly. A method of obtaining or calculating the current location of the vehicle will be described later with reference to FIGS. 3 to 10.

The current location of the vehicle may be a coordinate value including a latitude and a longitude or may be a predetermined range including a plurality of coordinate values at which the vehicle may be stochastically positioned based on a central latitude and a central longitude.

The predetermined server refers to a server for providing a location-based service to a user who gets in the vehicle and is previously set by a mobile carrier, a manufacturer of a vehicle, or a service provider providing a location-based service.

Next, location-based information based on the current location is received from the server (S230).

A memory provided in the vehicle may not store every information due to a physical limitation thereof. Accordingly, the server may store all the information related to the location and selectively transmit some information corresponding to the current location among all the information to the vehicle based on the location information received from the vehicle. Alternatively, the server may search for information corresponding to the current location using the location information received from the vehicle and transmit the searched information, as the location-based information, to the vehicle.

The server may generate a virtual location table for the vehicle and update location information which is periodically/irregularly received in the location table. The server may check a location of the vehicle in real time using the location table, determine the location of the vehicle, or predict a place where the vehicle may enter.

The location-based information may be information selected by the server on the basis of the current location and include weather information of the current location, life information such as a department store, a medical institution, a theater, restaurants, and the like, near the current location, telematics information related to the current location, disaster information related to the current location, yellow dust information, and the like.

Next, the controller executes one or more functions using the location-based information (S250).

The controller may select at least one application installed in the vehicle control device using the location-based information received from the server and execute a specific function using the selected application. Alternatively, a function related to the location-based information may be executed using a predetermined application.

The application is a concept including a widget, a home launcher, and the like, and refers to all types of programs that may be driven by the vehicle control device. Accordingly, the application may be a program to perform functions of a web browser, video playback, message transmission/reception, schedule management, vehicle running management, braking management, air purification, and temperature control.

In another example, the application may be a program to perform autonomous driving of the vehicle and may control autonomous driving to a destination input from the user. Here, the controller may change a route of the vehicle, change lanes, or change the setting related to autonomous driving on the basis of the location-based information.

According to the driving scheme, although the vehicle does not store location-based information regarding all the areas in which the vehicle may drive, the vehicle may provide a location-based service using the location-based information provided from the server.

Meanwhile, the vehicle control device according to the present disclosure may operate in a vehicle-to-everything (V2X) communication environment. V2X refers to a vehicular communication system which exchanges or shares information such as traffic conditions, while communicating with a road infrastructure and other vehicles during driving. That is, V2X refers to an environment in which information is shared through a wired/wireless network based on a vehicle.

In the ongoing smart-car related business, most specific automobile or platform companies provide services to a single vehicle, and thus, it is impossible to reflect actual situation information of a road by 100%. However, by utilizing the V2X communication-based wireless vehicle network, the vehicle control device may maximize the safety and efficiency of driving by using big data provided from various sources.

V2X communication generally refers to wireless communication between vehicles (vehicle-to-vehicle (V2V) communication, wireless communication between a vehicle and an infrastructure (vehicle-to-infrastructure (V2I), an in-vehicle networking (IVN), a communication between a vehicle and a mobile terminal (vehicle-to-pedestrian (V2P), and the like.

The vehicle control device performs control related to the vehicle using all the information shared by V2X communication. For example, the controller may more accurately calculate a current location of the vehicle using V2X communication.

In order for a location-based service to be successfully performed in an environment in which V2X communication is provided, all the vehicles subscribed to the location-based service must support the V2X communication function and have a function to accurately obtain their current location.

However, since the V2X communication function will be introduced step by step, a specific vehicle may not support V2X communication or cannot obtain its current location. In addition, the current location, which is normally obtained, may be erroneously calculated due to failure of a sensor or acquisition of the current location may be interrupted. In this case, the vehicle control device cannot transmit the current location of the vehicle to the server, thereby causing a problem that the location-based service cannot be provided.

In order to solve the problem, the vehicle control device according to the present disclosure obtains its own location information by utilizing the sensors provided in the vehicle and a surrounding V2X infrastructure (another vehicle, V2X base station, terminal, etc.).

From a device that fixedly transmits preset location information, location information of the device is received, and a current location of the vehicle is set using the received location information of the device. Hereinafter, a method of setting a current location using location information of the device will be described in detail with reference to FIG. 3.

FIG. 3 is a flowchart illustrating a method of setting, by a control device for a vehicle, a current location upon receiving location information of a device which fixedly transmits preset location information, from the device.

The vehicle control device 100 obtains location information of the vehicle based on a predetermined reference (S310).

The controller may determine whether the vehicle has capability to obtain a current location of the vehicle based on a predetermined reference. Here, "having capability" means that a sensor capable of measuring the current location of the vehicle is provided in the vehicle and the controller has authority to use information output from the sensor.

Since the types of sensors provided for each vehicle are different, the predetermined reference may vary depending on types of vehicles.

The sensor may be one or more sensors and may include a GPS, a camera, a Lidar, a radar, a speed sensor, a direction sensor, an acceleration sensor, an ultrasonic sensor, and the like. For example, the vehicle control device may obtain location information of the vehicle using GPS information. In another example, the vehicle control device may obtain a real-time image using a camera and obtain location information of the vehicle using a sign (or notice) and/or a signboard included in the real-time image or correct the obtained information using the GPS information.

Here, the "location information of the vehicle" refers to information output from each sensor and information determined by the sensors provided in the vehicle, and the "current location of the vehicle" refers to information finally determined using various information obtained from the inside and outside of the vehicle. The location information of the vehicle may be used for determining the current location of the vehicle and the current location of the vehicle is limitedly transmitted to a predetermined server.

Meanwhile, in case where a sensor capable of calculating the location information of the vehicle is not provided in the vehicle or the sensor provided therein does not operate normally due to a fault, or the like, the location information of the vehicle may be obtained by the predetermined reference.

Next, the location information of an external infrastructure is received from the external infrastructure (S330).

The vehicle control device may share location information output from an infrastructure located outside the vehicle in the V2X communication environment, as well as sensors provided in the vehicle. The vehicle control device may map the location information of the vehicle obtained from the sensor and the location information of the external infrastructure received from the external infrastructure to the current location of the vehicle.

The external infrastructure is limited to an external infrastructure located within a predetermined distance from the vehicle control device. The predetermined distance may vary depending on performance of the wireless communication unit or may vary depending on a user input. For example, the user may set the predetermined distance to be small to increase positional accuracy of the vehicle control device. However, as the predetermined distance is reduced, a probability that a situation in which the current location of the vehicle cannot be set occurs may increase.

The external infrastructure may be classified into terminals and devices depending on whether a location thereof is fixed. An external infrastructure may be called an "external terminal".

In detail, the external terminal may include at least one of a fixed terminal which transmits predetermined location information from a fixed location and a mobile terminal which is mounted on a movable object and transmits flexible location information.

Hereinafter, the fixed terminal will be referred to as a "device" and the mobile terminal will be referred to as a "terminal".

An infrastructure whose location is flexible and thus shared location information is variable may be referred to as a "terminal". For example, another vehicle (or a vehicle control device provided in the other vehicle), a mobile terminal such as a wearable device or a mobile phone may be included in the terminal. Since the location of the terminal is flexible, the location information of the terminal output from the terminal is also variable.

In the case of the terminal, the terminal has dynamic location information, but if the terminal is a mobile terminal located inside a vehicle or another vehicle which is driving near the own vehicle, it may provide relatively precise location information to the vehicle control device.

Alternatively, an infrastructure which is fixed in location and shares fixed location information may be called a "device". For example, a base station, a traffic sign, a CCTV, and the like, outputting fixed location information may be included in the device. That is, the device refers to a device which is fixed in location and transmits unchanged location information, like a base station. The device has the advantage of outputting very accurate location information.

The fixed terminal may correspond to a WiFi device, a base station of dedicated short-range communications (DSRC), or a base station of cellular vehicle-to-everything (C-VTX).

Here, the DSRC refers to a short-range wireless communication technology between a road side unit (RSU) and a vehicle control device (an on-board unit (OBU)), and the C-VTX refers to a technology allowing the vehicle control device to exchange information with an object in which an infrastructure is established such as another vehicle, a road, and the like, through a wired/wireless network. The C-VTX generally refers to wireless communication between vehicles (vehicle-to-vehicle (V2V)), wireless communication between a vehicle and an infrastructure (vehicle-to-infrastructure (V2I)), in-vehicle wired/wireless networking (in-vehicle networking (IVN)), communication between a vehicle and a mobile terminal (vehicle-to-pedestrian (V2P)).

Next, the vehicle control device sets a current location of the vehicle using at least one of the location information of the vehicle obtained from the sensor provided in the vehicle and the location information of the external infrastructure transmitted from the external infrastructure (S350).

Here, the vehicle control device determines whether the location information of the vehicle may be obtained according to a predetermined reference.

If the location information of the vehicle may not be obtained as a result of the determination, the current location of the vehicle is set using the location information of the external infrastructure. For example, the location of the external infrastructure may be set to the current location of the vehicle. Furthermore, the current location of the vehicle may also be reset in consideration of a movement direction and speed of the vehicle on the basis of the location of the external infrastructure as a reference point.

In this case, the vehicle control device may obtain the current location of the vehicle using the information received from the external infrastructure even in a situation where the location information of the vehicle cannot be obtained by the sensor provided in the vehicle.

Meanwhile, pieces of location information of a plurality of external infrastructures may be received from each of the external infrastructures. In this case, the vehicle control device may select any one of the external infrastructures on the basis of distances between the vehicle and each of the external infrastructures and set the current location of the vehicle using the location information of the selected external infrastructure.

For example, when pieces of location information are received from m external infrastructures, an n-th external infrastructure closest to the vehicle, among the m external infrastructures, is selected, and the current location of the vehicle may be set using location information of the n-th external infrastructure. Here, m is a natural number, n is a natural number equal to or smaller than the m, and at least one of the m and the n may vary as the vehicle moves or the external infrastructure moves.

When the vehicle moves in a state in which the n-th external infrastructure among the m external infrastructures is the external infrastructure closest to the vehicle, the vehicle control device may reset the current location of the vehicle according to a location of the n-th external infrastructure, a movement direction of the vehicle, and a speed of the vehicle.

Alternatively, the external infrastructure located closest to the vehicle, among the m external infrastructures, may be changed from the n-th external infrastructure to an x-th external infrastructure. In this case, the vehicle control device, which has set the current location of the vehicle using the n-th external infrastructure, resets the current location of the vehicle using the x-th external infrastructure. That is, the vehicle control device sets the current location of the vehicle using the x-th external infrastructure instead of the location information of the n-th external infrastructure. Here, x is a natural number equal to or smaller than m and different from n.

Since the location information of the external infrastructure located closest to the vehicle is used, it is possible to obtain the current location of the vehicle more accurately even when it is impossible to obtain the location information of the vehicle.

The vehicle control device may set a current location of the vehicle on the basis of any one of the external terminals. In this case, the vehicle control device may start autonomous driving to follow the external terminal to continuously use the location information of the external terminal. More specifically, the vehicle control device controls the vehicle to perform autonomous driving such that a predetermined distance from the selected external terminal is maintained.

Since the vehicle control device can calculate the distance to the external terminal, if the autonomous driving is performed such that a certain distance from the external terminal is maintained, the location information of the external terminal may be continuously used. Therefore, in case where it is not possible to accurately calculate the current position due to a sensor failure of the vehicle, location-based information may be provided by following the other vehicle providing accurate location information.

Meanwhile, the vehicle control device may further include a display unit and output information on the external infrastructure used for setting the current location of the vehicle to the display unit. The information output on the display unit may change according to a change in the external infrastructure used for setting the current location, and the user present in the vehicle may check based on which information the current location of the vehicle is set.

Meanwhile, hacking may occur to illegally access a weak security network of the V2X communication environment or to cause a harmful influence on the vehicle. For example, there may be a hacking infrastructure which sends out fake location information that may lead to an accident.

In order to protect the vehicle from such a hacking infrastructure, when the current location of the vehicle is set using an external infrastructure, the vehicle control device may transmit the current location of the vehicle and information of the external infrastructure used for setting the current location of the vehicle to a preset server.

The server analyzes the information of the external infrastructure to determine whether it corresponds to the hacking infrastructure. When the information corresponds to the hacking infrastructure, the server transmits an unavailability message to the vehicle control device.

In response to the unavailability message, the vehicle may select another infrastructure closest to the vehicle, among infrastructures other than the corresponding external infrastructure, and may set the current location of the vehicle using the other selected location information. Accordingly, the vehicle control device may be protected from the hacking infrastructure.

Meanwhile, in case where the location information of the vehicle can be obtained, the current location of the vehicle is set using both the location information of the vehicle and the location information of the external infrastructure. In this case, since the vehicle control device uses information obtained from various sources, it becomes possible to obtain a more accurate current location of the vehicle.

Figure 4A:
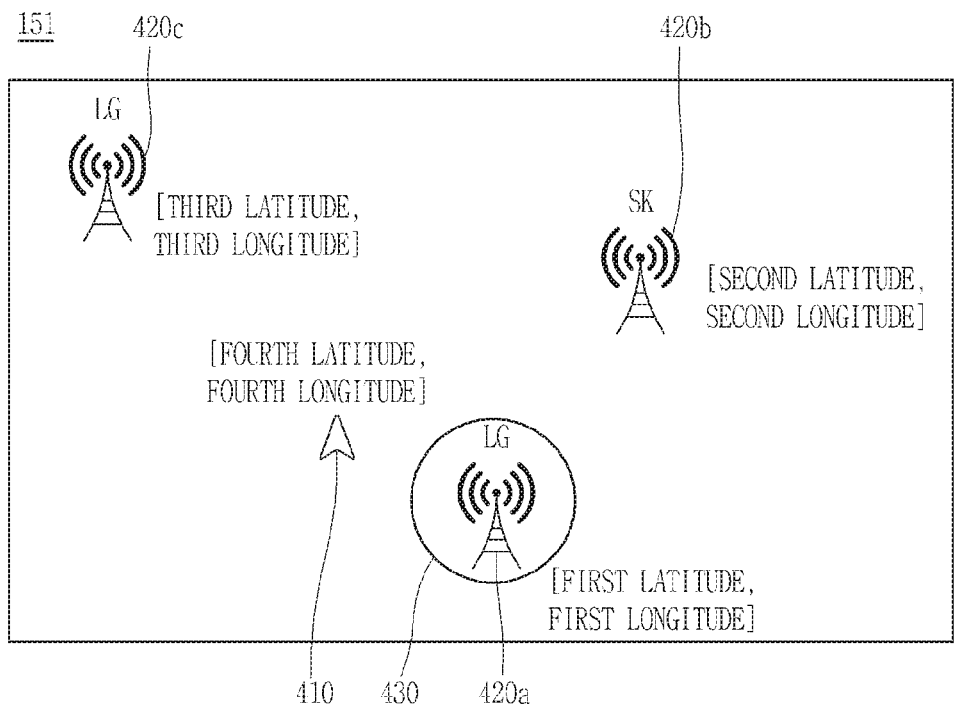
FIGS. 4A, 4B, and 4C are conceptual views illustrating an operation of a control device for a vehicle according to the control method of FIG. 3.
Figure 4B:
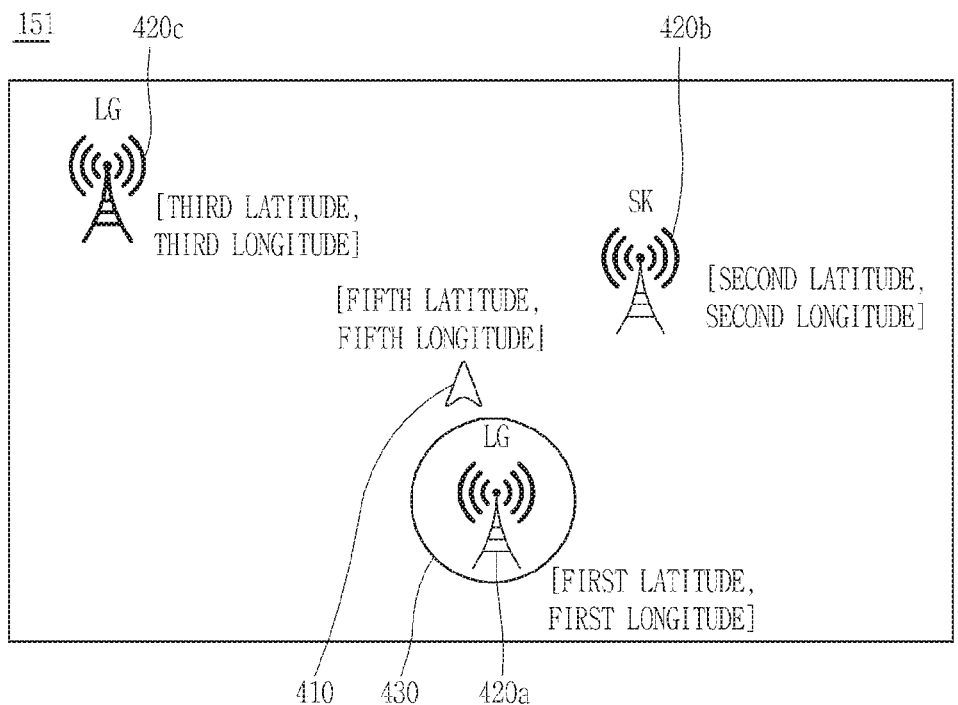
Figure 4C:
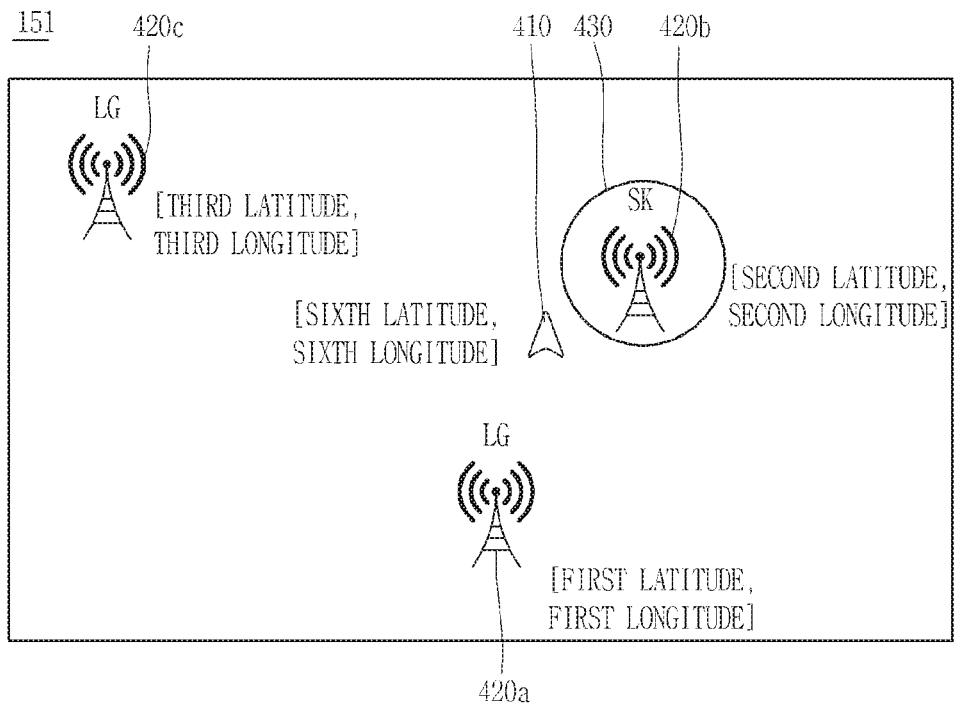

FIGS. 4A, 4B, and 4C are conceptual views illustrating an operation of the vehicle control device according to the control method of FIG. 3.

The vehicle control device according to the present disclosure includes a display unit 151.

Although not illustrated in the drawings, a portion of a map including the current location of the vehicle may be displayed on the display unit 151. A graphic object 410 representing the vehicle may be displayed at a point corresponding to the current location of the vehicle on the map.

Also, the display unit 151 may display information 420a, 420b, and 420c of the external infrastructure which has transmitted the location information to the vehicle control device.

The information of the external infrastructure may be different images according to types of the external infrastructure. Here, different images refer to images different in shape, length, color, and the like, for example.

Further, the information of the external infrastructure may include information on the type of the external infrastructure, location information of the external infrastructure, a provider providing the external infrastructure, and a precondition for using the location information of the external infrastructure.

According to an embodiment illustrated in FIG. 4A, the user may recognize that the first and third external infrastructures correspond to base stations provided by the LG and include [first latitude, first latitude] and [third latitude, third latitude], respectively, through visual information output on the display unit 151 (420a, 420c).

Here, the precondition for using the location information of the external infrastructure refers to a condition that the vehicle control device must perform in order to use the location information of the external infrastructure. That is, the vehicle control device may be provided with the location information of the external infrastructure only if the precondition is fulfilled. For example, a precondition may be set such that the location information of the external infrastructure may be used only when an advertisement transmitted from the external infrastructure is output on the display unit of the vehicle control device for a predetermined time and/or a predetermined number of times.

Meanwhile, when there are a plurality of external infrastructures providing location information, an external infrastructure located closest to the vehicle is selected and the current location of the vehicle is set according to the location information of the selected external infrastructure. For example, a first external infrastructure located closest to the vehicle, among the first to third external infrastructures, is selected, and the vehicle control device may set the current location (fourth latitude, fourth longitude) of the vehicle using the location information (first latitude, first longitude) of the first external infrastructure.

As the vehicle moves, the current location of the vehicle changes. In this case, the vehicle control device may reset the current location of the vehicle no the basis of a speed and a movement direction of the vehicle, as well as the location information of the first external infrastructure. For example, as illustrated in FIGS. 4A and 4B, when the location of the vehicle has moved, the current location of the vehicle is reset on the basis of the location information of the first external infrastructure and a speed and a movement direction of the vehicle ([fourth latitude, fourth longitude]→[fifth latitude, fifth longitude]).

Meanwhile, as the location of the vehicle is changed, the external infrastructure closest to the vehicle may be changed. For example, as illustrated in FIGS. 4B and 4C, the external infrastructure closest to the vehicle may be changed from the first external infrastructure to a second external infrastructure. In this case, the vehicle control device resets the current location of the vehicle using location information of the second external infrastructure instead of the first external infrastructure ([5th latitude, 5th latitude]→[6th latitude, 6th latitude]).

In outputting the information of the external infrastructure, the vehicle control device may perform highlighting so that the external infrastructure used for setting the current location of the vehicle and the external infrastructure not used for setting the current location are distinguished. For example, the vehicle control device may output guide information 430 for guiding the external infrastructure in use. Accordingly, the user who checks the display may recognize the external infrastructure selected by the vehicle control device.

Meanwhile, an external infrastructure includes a terminal whose location is flexible. A terminal is a stuff with mobility, and information regarding a location in which an owner of the stuff is present or has been present at a specific time is protected by the rule, or the like, and therefore, there must be an agreement by the owner. Thus, if the external infrastructure is a terminal, control different from that of a device is required.

Figure 5:
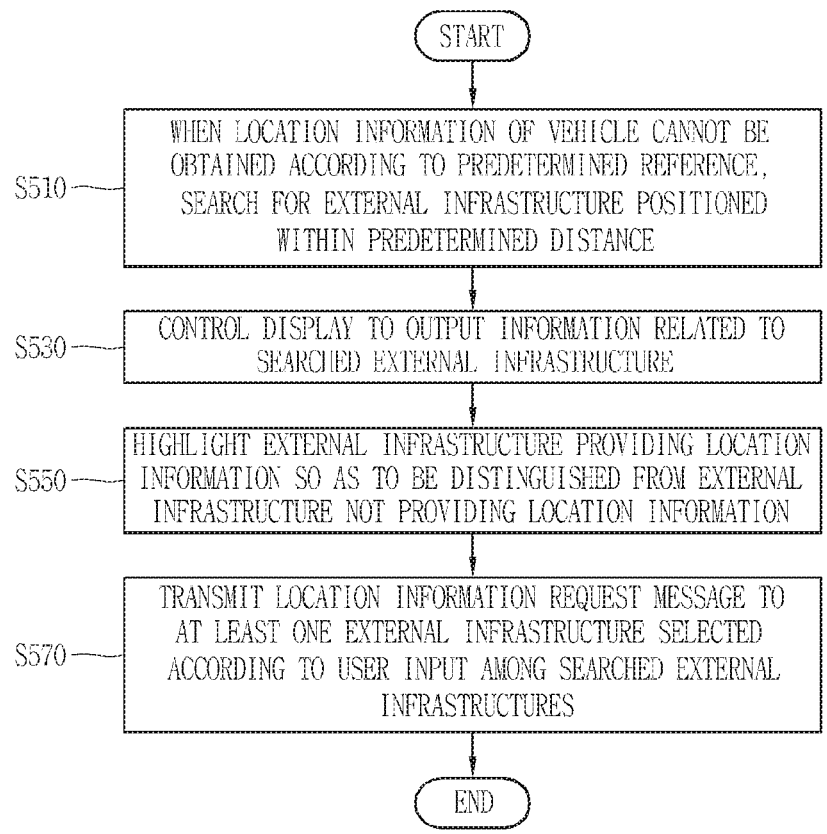
FIG. 5 is a flowchart illustrating a method of receiving location information of a terminal from the terminal and setting a current location by a control device for a vehicle according to the present disclosure.
Figure 6A:
FIGS. 6A, 6B, and 6C are conceptual views illustrating an operation of a control device for a vehicle according to the control method of FIG. 5.
Figure 6B:
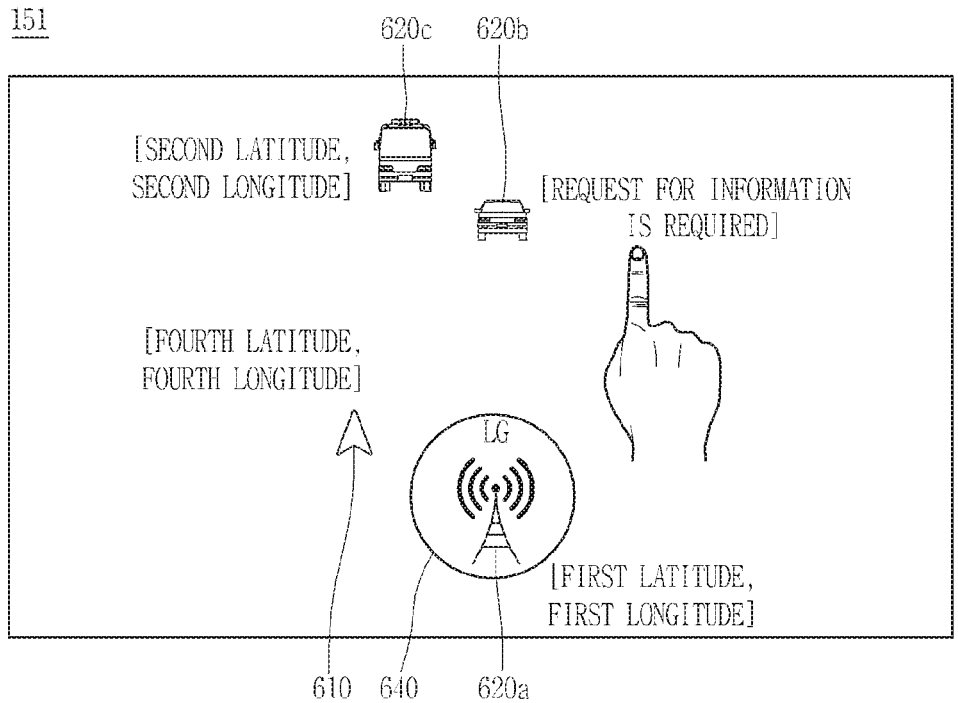
Figure 6C:
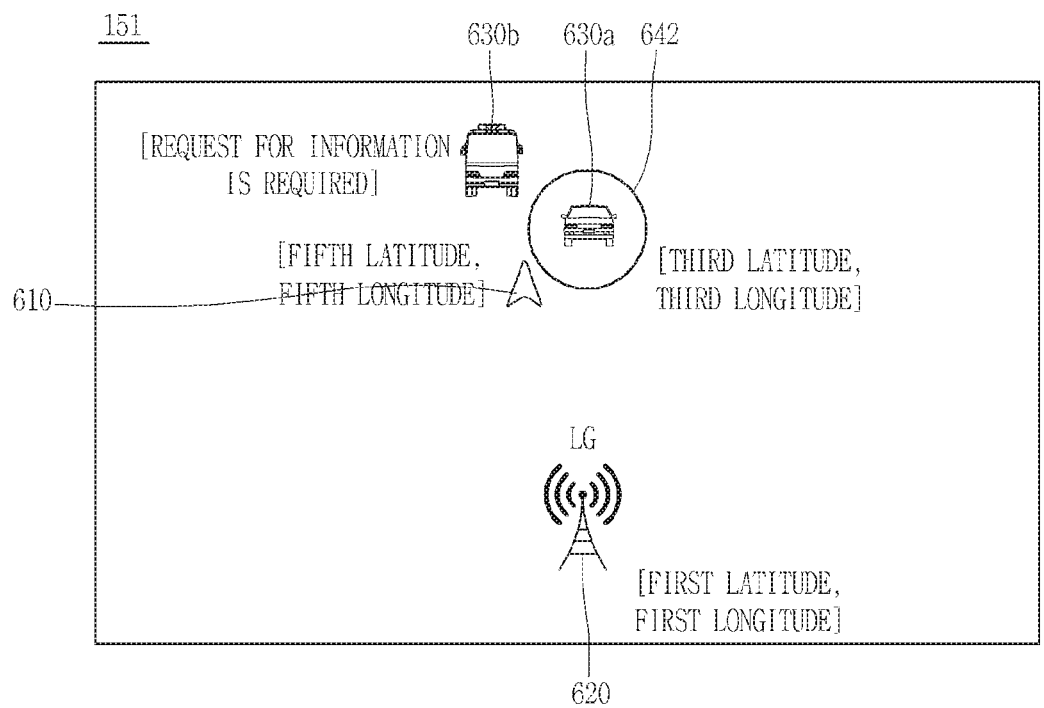

FIG. 5 is a flowchart illustrating a method of receiving location information of a terminal from the terminal and setting a current location by a vehicle control device according to the present disclosure, and FIGS. 6A, 6B, and 6C are conceptual views illustrating an operation of a vehicle control device according to the control method of FIG. 5.

In case where location information of a vehicle can be obtained on the basis of a predetermined reference, the vehicle control device sets the current location of the vehicle using the obtained location information of the vehicle. Since this case is a normal situation, the vehicle may display general navigation information.

For example, as illustrated in FIG. 6A, a portion of a map may be output and a graphic object 610 indicating the vehicle may be output on a point corresponding to the current location of the vehicle.

Meanwhile, if the vehicle control device cannot obtain the location information of the vehicle on the basis of the predetermined reference, the vehicle control device searches for an external terminal located within a predetermined distance (S510).

As described above with reference to FIG. 3, the vehicle control device may determine whether it is possible to obtain the location information of the vehicle. If there is no sensor to obtain the location information of the vehicle or if the location information of the vehicle may not be obtained due to a fault of the sensor, the vehicle control device may determine that it is not possible to obtain the location information of the vehicle according to the predetermined reference.

In this case, the vehicle control device searches for a terminal located within a predetermined distance. Furthermore, the vehicle control device may output notification information indicating that it is not possible to obtain the location information of the vehicle according to the predetermined reference.

For example, the search for the external infrastructure may be performed as the vehicle control device broadcasts a location information request message. The external infrastructure may transmit its location information to the vehicle control device in response to the location information request message, and the vehicle control device may search for the external infrastructure using information received from the external infrastructure. In another example, the vehicle control device may search for an external infrastructure using a sensor such as a lidar.

Next, the display may be controlled so that information related to the searched external infrastructure is output (S530).

The vehicle control device may output a map on a display and simultaneously output information corresponding to an external infrastructure searched at a point corresponding to the external infrastructure searched on the map.

For example, as illustrated in FIG. 6B, when first to third external infrastructures are searched, the vehicle control device may display pieces of information 630a, 630b, and 630c of the external infrastructures.

The vehicle control device may select any one of the external infrastructures and set a current location of the vehicle using location information of the selected external infrastructure. Here, guide information 520 for guiding the selected external infrastructure and the current location of the vehicle ([fourth latitude, fourth longitude]) may be further output.

Next, the external infrastructure providing the location information may be highlighted to be distinguished from the external infrastructure not providing location information (S550).

There may be an external infrastructure which has been searched but does not provide location information. In this case, the vehicle control device may perform highlighting so that the external infrastructure providing the location information and the external infrastructure not providing location information are distinguished from each other.

In another example, as illustrated in FIG. 6B, in the case of the external infrastructure providing location information, the location information is output, and in the case of the external infrastructure that does not provide location information, a message indicating that an information request is required may be output.

A location information request message may be transmitted to at least one external infrastructure selected by a user input among the searched external infrastructures (S570). When location information is received from the external infrastructure selected by the user input, the vehicle control device sets a current location of the vehicle using the location information of the selected external infrastructure.

For example, in the case of the external infrastructure that does not provide location information, an icon set to generate a location information request message may be displayed. When a touch is applied to the icon, the vehicle control device selects an external infrastructure corresponding to the icon and transmits the location information request message to the selected external infrastructure. Accordingly, the vehicle control device may set the current location of the vehicle using the location information of the external infrastructure that did not provide the location information.

Although not shown, the external infrastructure receiving the location information request message may output information of the vehicle which has transmitted the location information request message. Also, the external infrastructure may output an interface allowing the user to select whether to share the location information thereof to the corresponding vehicle. Only when permission to use is received from the user of the external infrastructure, the external infrastructure shares its location information.

As illustrated in FIG. 6B, in a state in which the current location of the vehicle is set using the first external infrastructure 620*a* closest to the vehicle, the vehicle control device may transmit a location information request message to the second external infrastructure 620*b* in response to a user input. When location information is received from the second external infrastructure 620*b*, the vehicle control device sets the current location of the vehicle using location information of the second external infrastructure as illustrated in FIG. 6C. As the external infrastructure used to set the current location of the vehicle is changed, an output position of guide information 640 for guiding the external infrastructure in use is also changed.

Meanwhile, the vehicle control device according to the present disclosure may verify the location information of the vehicle generated from the sensors provided in the vehicle using the location information received from the external infrastructure. Hereinafter, a method for verifying validity of a plurality of sensors provided in a vehicle will be described in detail.

Figure 7:
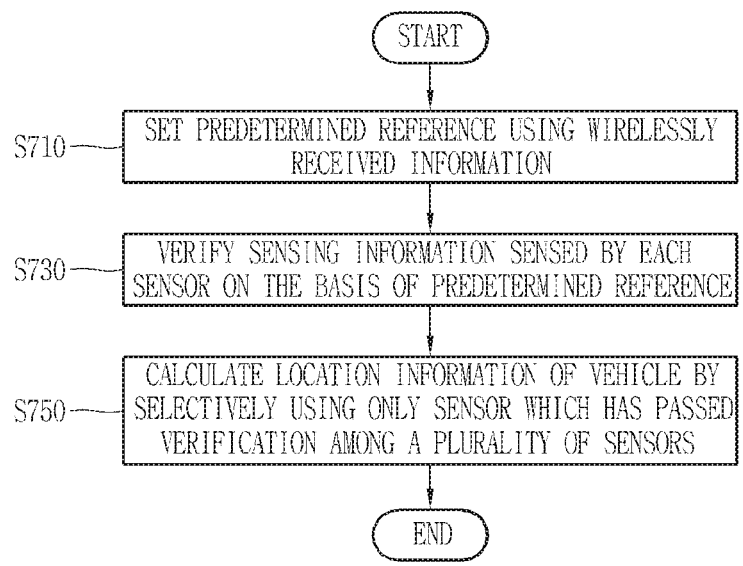
FIG. 7 is a flowchart illustrating a method for calculating location information of a vehicle by selectively using a plurality of sensors provided in the vehicle by a control device for the vehicle according to the present disclosure.
Figure 8A:
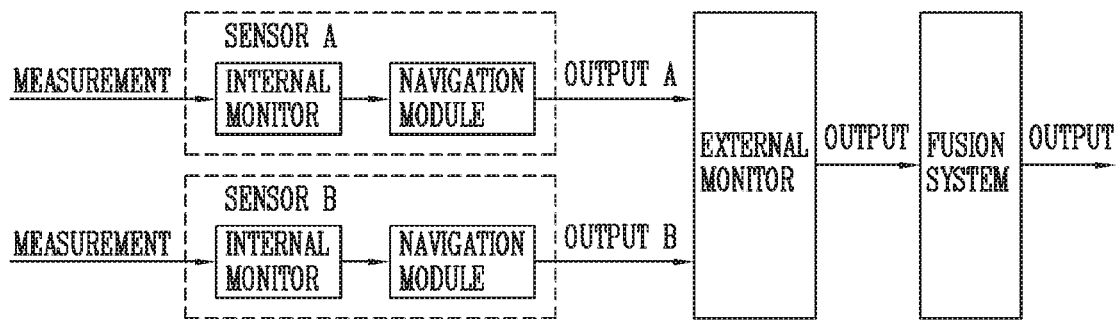
FIGS. 8A, 8B, and 8C are views illustrating the control method of FIG. 7.
Figure 8B:
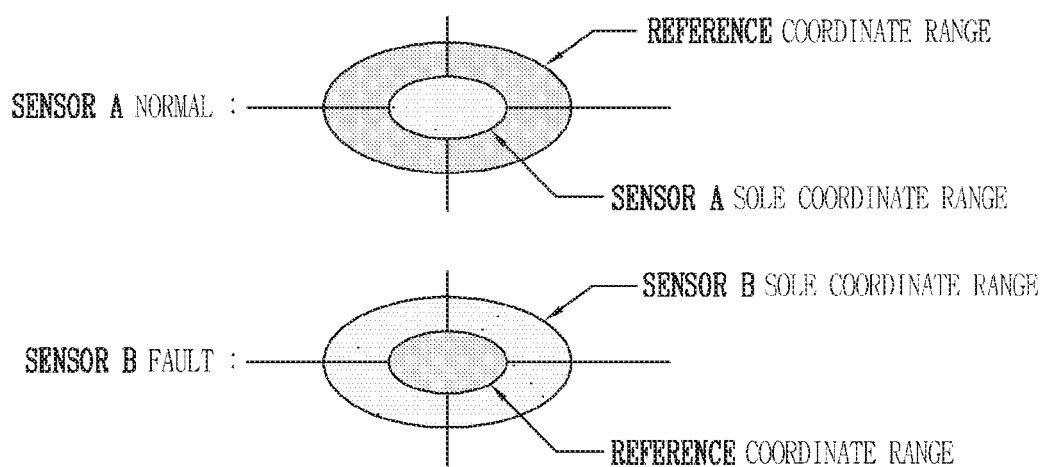
Figure 8C:
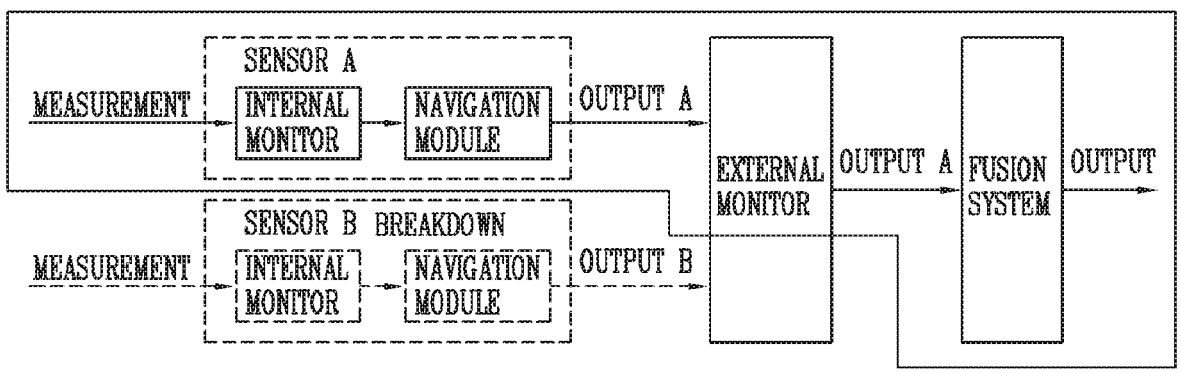

FIG. 7 is a flowchart illustrating a method for calculating location information of a vehicle by selectively using a plurality of sensors provided in the vehicle by a control device for the vehicle according to the present invention, and FIGS. 8A, 8B, and 8C are views illustrating the control method of FIG. 7.

In order to verify validity of a value generated by a sensor, that is, a fault of the sensor, a reference coordinate range is required. However, since a location of the vehicle continuously changes, how to set the reference coordinate range is a problem.

The vehicle control device according to the present disclosure sets a predetermined reference using location information of an external infrastructure received wirelessly (S710). Here, the predetermined reference may be a reference coordinate range.

The vehicle control device may receive location information of another vehicle located and location information of a mobile terminal and a base station within a predetermined distance in various manners. Location information received from an external infrastructure includes information such as a distance, an angle, and the like, as well as a sender ID, a location, a direction, and a speed.

The location information received from the terminal may include a sensor fault error, while the location information received from a device such as a base station has no influence regarding a sensor fault error and a coordinate value fixed by an initial service provider (e.g., mobile carrier) is transmitted. Accordingly, the reference coordinate range is calculated using the location information of the device, and in case where it is not possible to use the location information of the device, the reference coordinate range is calculated using the location information of the terminal.

The vehicle control device may calculate a reference coordinate range using a network-based positioning algorithm (e.g., Cell-ID, AOA, TOA, TDOA) on the basis of the location information of the device or the location information of the terminal.

Next, sensing information sensed by each sensor may be verified on the basis of a predetermined reference (S730).

Recently, since final location information of the vehicle is calculated by combining a plurality of pieces of location information generated by the plurality of sensors, if at least one sensor has a fault, finally output location information of the vehicle may have a significant error.

In the related art, each sensor independently performs internal monitoring to determine whether measurement values thereof have an error through analysis of consistency of the measurement values and time series, and each sensor calculates location information by removing a fault measurement value detected by the internal monitoring.

In an environment available for V2X communication, location information received from an external infrastructure, as well as sensors provided in a vehicle, may be used. More specifically, the vehicle control device may set a reference coordinate range using the location information received from the external infrastructure and may detect and remove a fault of a sensor provided in the vehicle.

For example, as illustrated in FIG. 8A, when sensors for sensing the location information of the vehicle includes first and second sensors (sensors A and B), the first sensor (sensor A) outputs first location information (output A) and the second sensor (sensor B) outputs second location information (output B). That is, each sensor outputs its own location information according to a unique sensing method.

Each sensor calculates location information independently using a measurement value verified in validity through an internal monitor provided in each sensor.

Thereafter, a controller (or an external monitor) performs consistency checking and time series analysis using the reference coordinate range and the location information output from each sensor and verifies whether each sensor has a fault.

For example, as illustrated in FIG. 8B, when the reference coordinate range is larger than or equal to the range of the location information output from the sensor, it is determined that the corresponding sensor operates normally. Alternatively, if the reference coordinate range is smaller than the range of the location information output from the sensor, it is determined that the corresponding sensor is broken.

Next, the location information of the vehicle may be calculated by selectively using only the sensors which have passed the verification among the plurality of sensors (S750).

When the first sensor (sensor A) is normal and the second sensor (sensor B) is abnormal as illustrated in FIG. 8B, a controller (or a fusion system) calculates the location information of the vehicle using only the first location information (output A) output from the first sensor (sensor A), excluding the second sensor (sensor B). In other words, in calculating the location information of the vehicle, the vehicle control device does not use the location information (output B) of the second sensor determined to have a fault and excludes it.

If no sensor, among the plurality of sensors provided in the vehicle, has passed the verification, the vehicle control device determines that it is not possible to obtain location information of the vehicle according to the predetermined reference. Since all the sensors are determined to have a fault, the vehicle control device sets the current location of the vehicle using location information of an external infrastructure.

FIG. 9 is a flowchart illustrating a control method of a control device for a vehicle according to an embodiment of the present disclosure.

The vehicle control device may determine whether there is capability to obtain a current location of the vehicle on the basis of a predetermined reference (S910). If there is at least one sensor capable of measuring the current location of the vehicle in the vehicle and if there is authority to use information output from the sensor, it is determined that there is capability.

If there is capability, the vehicle control device may measure the location information using at least one available sensor (S940). The location information sensed by each sensor is output.

Next, the vehicle control device verifies the sensed location information from each sensor (S942) and obtain the current location of the vehicle using the location information measured by the sensor (S946).

The vehicle control device may perform verification using the method described above with reference to FIG. 7 and may calculate the location information of the vehicle by selectively using only the sensor which have passed the verification, among the plurality of sensors. When at least one sensor has passed the verification, the vehicle control device calculates the location information of the vehicle by combining the location information output from the at least one sensor which has passed the verification, and obtains the current location of the vehicle using the calculated location information.

Meanwhile, if there is no capability, the vehicle control device searches for a terminal located within a predetermined range (S920), and determines whether the searched terminal shares location information (S922).

When the searched terminal shares the location information, reliability of the shared location information may be verified (S924). The vehicle control device verifies reliability of all the received location information. Here, verifying the signal refers to calculating a distance between the vehicle and the external infrastructure using the location information and searching for the external infrastructure located closest to the vehicle. The vehicle control device may calculate an absolute location and a relative location of the external infrastructure by using information (e.g., a signal arrival time and an arrival angle) generated in a signal received from the external infrastructure, as well as the location information measured from the sensor, and may search for a signal closest to the vehicle.

When a subject which has transmitted the signal closest to the vehicle is a terminal, the current location of the vehicle is obtained using the location information received from the terminal (S926). If the subject which has transmitted the signal closest to the vehicle is a device, the current location of the vehicle may be obtained using the location information received from the device (S930).

If the terminal located within a predetermined range is not searched or if a searched terminal does not share location information, the current location of the vehicle may be obtained using location information received from a device such as a base station (930).

FIGS. 10A, 10B, and 10C are views illustrating location information generated according to the control method of FIG. 9.

FIG. 10A is a diagram illustrating locations of first to third vehicles (VEH #1 to VEH #3) and locations of first and second base stations (ANT #1 and ANT #2) at time points t0 to t3.

FIG. 10B illustrates that the first vehicle (vehicle 1) has capability to estimate its location and the sensor operates normally. The second vehicle (vehicle 2) has capability to estimate its location, but it cannot obtain location information due to a fault generated at a sensor at the time point t2. The third vehicle (vehicle 3) does not have capability to estimate its location, so it cannot obtain location information.

The second vehicle (vehicle 2) cannot provide a location-based service from the time point t2, and the third vehicle (vehicle 3) cannot provide the location-based service from the time point t0.

FIG. 10C is a diagram for explaining an example in which the vehicle control device according to the present disclosure obtains location information through the above-described method.

At the time point t0, the third vehicle (vehicle 3) cannot obtain location information from the sensor. However, according to the present disclosure, a control device of the third vehicle is able to set the current location t0 of the third vehicle using the location information of the second base station ANT #2 located closest thereto.

At the time point t1, the external infrastructure closest to the third vehicle is the second base station ANT #2. Therefore, the control device of the third vehicle may set the current location t1 of the third vehicle using the location information of the second base station ANT #2.

At the time point t2, the external infrastructure closest to the third vehicle is changed from the second base station ANT #2 to the first base station ANT #1. Therefore, the control device of the third vehicle sets the current location t2 of the third vehicle using the location information of the first base station ANT #1 instead of the second base station ANT #2.

At the time point t2, the second vehicle cannot measure location information using the sensor. However, since the control device of the second vehicle receives the location information of the first vehicle and the location information of the first base station, it sets the current location t2 of the second vehicle using the location information of the first vehicle positioned closest thereto.

Since there is no change in the external infrastructure located to be closest at the time point t3, the control device of the third vehicle sets the current location t3 of the third vehicle using the location information of the first base station ANT #1, and the control device of the second vehicle sets the current location t3 of the second vehicle using the location information of the first vehicle.

Accordingly, the vehicle control device according to the present disclosure may obtain the current location of the vehicle even when there is no sensor for sensing location information or even in a situation in which the sensor has a fault, and provide a location-based service with respect to the obtained current location.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid-state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A vehicle control method for controlling a vehicle having a sensor and a display, the vehicle control method comprising:
   generating location information of the vehicle based on information received from the sensor;
   when an external terminal is located within a predetermined range of the vehicle, receiving location information of the external terminal from the external terminal;
   setting a current location of the vehicle based on one of the location information of the vehicle or the location information of the external terminal; and
   executing one or more functions based on the set current location,
   wherein setting of the current location of the vehicle includes:
      receiving location information from each fixed terminal of a plurality of fixed terminals;
      selecting one fixed terminal of the plurality of fixed terminals based on distances between the vehicle and each fixed terminal of the plurality of fixed terminals;
      setting the current location of the vehicle using location information of the selected one fixed terminal;
      transmitting the current location of the vehicle and the location information of the selected one fixed terminal to a server;
      when an unavailability message regarding the selected one fixed terminal is received from the server, selecting another fixed terminal from the plurality of fixed terminals excluding the selected one fixed terminal; and
      resetting the current location of the vehicle using location information of the selected another fixed terminal.

2. The vehicle control method of claim 1, wherein setting the current location of the vehicle includes:
   when the location information of the vehicle meets a predetermined reference, setting the current location of the vehicle using the location information of the vehicle; and
   when the location information of the vehicle does not meet the predetermined reference, setting the current location of the vehicle using the location information of the external terminal.

3. The vehicle control method of claim 2, wherein setting the current location of the vehicle further includes setting the predetermined reference using the location information of the external terminal.

4. The vehicle control method of claim 3, wherein the sensor is one of a plurality of sensors, and
   wherein generating the location information of the vehicle includes:
      verifying sensing information sensed by each sensor of the plurality of sensors based on the predetermined reference; and
      generating location information of the vehicle by selectively using only a sensor which has passed verification, among the plurality of sensors.

5. The vehicle control method of claim 4, wherein, when no sensor of the plurality of sensors has passed verification, it is determined that the location information of the vehicle does not meet the predetermined reference.

6. The vehicle control method of claim 1, wherein the external terminal includes at least one of the selected another fixed terminal or a mobile terminal which is mounted to a movable object and transmits flexible location information.

7. The vehicle control method of claim 6, wherein, the external terminal is the selected another fixed terminal.

8. The vehicle control method of claim 1, further comprising resetting the current location of the vehicle based on the location information of the selected another fixed terminal, a movement direction of the vehicle, and a speed of the vehicle.

9. The vehicle control method of claim 1, wherein setting the current location of the vehicle further includes:
   selecting one external terminal of a plurality of external terminals based on distances between the vehicle and each external terminal of the plurality of external terminals; and
   setting the current location of the vehicle based on one of the location information of the vehicle or location information of the selected one external terminal.

10. The vehicle control method of claim 9, further comprising controlling the vehicle to perform autonomous driving to maintain a predetermined distance from the selected one external terminal.

11. The vehicle control method of claim 1, further comprising:
   when it is determined that the external terminal is located within the predetermined range based on information received from the sensor, controlling the display to display information related to the external terminal; and
   when location information of the external terminal is received from the external terminal, highlighting the information related to the external terminal on the display to indicate that the location information of the external terminal is received.

12. The vehicle control method of claim 11, wherein, when the external terminal includes a first external terminal which transmits location information and a second external terminal which does not transmit location information are positioned within the predetermined range, information related to the first external terminal and information related to the second external terminal are displayed on the display, the information related to the first external terminal is highlighted, and the information related to the second external terminal is not highlighted.

13. The vehicle control method of claim 12, further comprising, when a user input is applied to the information related to the second external terminal, transmitting a location information request message to the second external terminal.

14. A vehicle control device for controlling a vehicle having a sensor and a display, the vehicle control device comprising:
   a controller configured to:
      determine when an external terminal is positioned within a predetermined range based on information received from the sensor; and
      control the display to display information related to the external terminal; and
   a communication unit configured to receive location information of the external terminal from the external terminal,
   wherein, when location information of the external terminal is received from the external terminal, the controller is configured to highlight information related to the external terminal to indicate that the location information of the external terminal is received, wherein the controller is further configured to:
receive location information from each fixed terminal of a plurality of fixed terminals;
select one fixed terminal of the plurality of fixed terminals based on distances between the vehicle and each fixed terminal of the plurality of fixed terminals;
set a current location of the vehicle using location information of the selected one fixed terminal;
transmit the current location of the vehicle and the location information of the selected one fixed terminal to a server;
when an unavailability message regarding the selected one fixed terminal is received from the server, select another fixed terminal from the plurality of fixed terminals excluding the selected one fixed terminal; and
reset the current location of the vehicle using location information of the selected another fixed terminal.

15. The vehicle control device of claim 14, wherein, when the external terminal includes a first external terminal which transmits location information and a second external terminal which does not transmit location information are positioned within the predetermined range, the controller controls the display to display information related to the first external terminal and information related to the second external terminal, the information related to the first external terminal is highlighted, and the information related to the second external terminal is not highlighted.

16. The vehicle control device of claim 15, wherein, when a user input is applied to the information related to the second external terminal, the controller is configured to transmit a location information request message to the second terminal using the communication unit.

17. The vehicle control device of claim 14, wherein the controller is configured to:
generate location information of the vehicle based on information received from the sensor, and
when the location information of the vehicle meets a predetermined reference, the controller is configured to set the current location of the vehicle using the location information of the vehicle, and
when the location information of the vehicle does not meet the predetermined reference, the controller is configured to set the current location of the vehicle using the location information of the external terminal.

18. The vehicle control device of claim 17, wherein the controller is configured to set the predetermined reference according to location information of the external terminal.

* * * * *